United States Patent
Cohen et al.

(10) Patent No.: US 9,851,245 B2
(45) Date of Patent: Dec. 26, 2017

(54) ACCUMULATING CHARGE FROM MULTIPLE IMAGING EXPOSURE PERIODS

(71) Applicant: MICROSOFT TECHNOLOGY LICENSING, LLC, Redmond, WA (US)

(72) Inventors: David Cohen, Nesher (IL); Shlomo Felzeshtein, Nesher (IL); Eli Larry, Beit She'an (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 639 days.

(21) Appl. No.: 13/670,239

(22) Filed: Nov. 6, 2012

(65) Prior Publication Data
US 2014/0125766 A1    May 8, 2014

(51) Int. Cl.
*H04N 13/02* (2006.01)
*G01J 1/42* (2006.01)
(Continued)

(52) U.S. Cl.
CPC .......... *G01J 1/4228* (2013.01); *G01S 7/4863* (2013.01); *G01S 17/89* (2013.01); *H04N 13/0271* (2013.01)

(58) Field of Classification Search
CPC .......... G01S 7/48; G01S 17/10; G01S 7/4863; H04N 5/35554; H04N 5/2256;
(Continued)

(56) References Cited

U.S. PATENT DOCUMENTS 5,081,530 A * 1/1992 Medina ..................... G01S 7/48
                                                    348/371
5,592,523 A * 1/1997 Tuy et al. ......................... 378/19
(Continued)

FOREIGN PATENT DOCUMENTS

DE    102011089629 A1    6/2012
WO    WO0052926 A1 *     9/2000    ......... H04N 5/35554
WO    2006130734 A2     12/2006

OTHER PUBLICATIONS

ISA European Patent Office, International Search Report and Written Opinion for Patent Application No. PCT/IB2013/002666, dated Mar. 3, 2014, 12 pages.
(Continued)

*Primary Examiner* — Jeremaiah C Hallenbeck-Huber
*Assistant Examiner* — Daniel Chang
(74) *Attorney, Agent, or Firm* — Alleman Hall Creasman & Tuttle LLP (57) ABSTRACT

Embodiments related to accumulating charge during multiple exposure periods in a time-of-flight depth camera are disclosed. For example, one embodiment provides a method including accumulating a first charge on a photodetector during a first exposure period for a first light pulse, transferring the first charge to a charge storage mechanism, accumulating a second charge during a second exposure period for the first light pulse, and transferring the second charge to the charge storage mechanism. The method further includes accumulating an additional first charge during a first exposure period for a second light pulse, adding the additional first charge to the first charge to form an updated first charge, accumulating an additional second charge on the photodetector for a second exposure period for the second light pulse, and adding the additional second charge to the second charge to form an updated second charge.

18 Claims, 6 Drawing Sheets

(51) Int. Cl.
*G01S 17/89* (2006.01)
*G01S 7/486* (2006.01)

(58) Field of Classification Search
CPC .. H04N 13/0253; H04N 5/332; H04N 5/3559; H04N 2005/2255; H04N 5/35536; H04N 5/35572; H04N 5/372; H01L 27/14643; H01L 27/14609
USPC .......... 315/152; 356/5.01; 348/46, 241, 266, 348/371; 378/19; 250/206, 208.1, 214
See application file for complete search history.

(56) References Cited

U.S. PATENT DOCUMENTS

| | | | | |
|---|---|---|---|---|
| 5,703,639 | A | * | 12/1997 | Farrier et al. .................. 348/241 |
| 5,870,142 | A | * | 2/1999 | Noda et al. .................... 348/266 |
| 6,760,070 | B1 | | 7/2004 | Merrill et al. |
| 7,554,652 | B1 | | 6/2009 | Babin et al. |
| 7,796,239 | B2 | | 9/2010 | Sawachi |
| 2010/0148676 | A1 | * | 6/2010 | Simmers ........................ 315/152 |
| 2010/0302528 | A1 | * | 12/2010 | Hall ............................... 356/5.01 |
| 2011/0164132 | A1 | | 7/2011 | Buettgen et al. |
| 2011/0187826 | A1 | | 8/2011 | Felzenshtein et al. |
| 2012/0082346 | A1 | | 4/2012 | Katz et al. |

OTHER PUBLICATIONS

Chiabrando, et al., "New Sensors for Cultural Heritage Metric Survey: The ToF Cameras", Retrieved at <<http://cipa.icomos.org/fileadmin/template/doc/PRAGUE/124.pdf>>, Geoinformatics, 2011, pp. 8.

Spickermann, et al., "CMOS 3D Image Sensor Based on Pulse Modulated Time-of-Flight Principle and Intrinsic Lateral Drift Field Photodiode Pixels", Retrieved at <<http://ieeexplore.ieee.org/stamp/stamp.jsp?arnumber=06044927>>, Proceedings of the ESSCIRC (ESSCIRC), 2011, Sep. 12, 2011, pp. 111-114.

Mutto, et al., "Combined Use of TOF Sensors and Standard Cameras for 3D Video Acquisition", Retrieved at <<http://www.dei.unipd.it/~dalmutto/Papers/09_STDay.pdf>>, in Proceedings of STreaming Day 2009, Sep. 2009, pp. 6.

* cited by examiner

ACCUMULATING CHARGE FROM MULTIPLE IMAGING EXPOSURE PERIODS

BACKGROUND

Depth cameras may utilize various technologies to sense depth. One example depth-sensing technology is time-of-flight ("TOF") depth sensing. A TOF depth camera determines depth values for a scene by transmitting light to illuminate the scene, and determining how long it takes transmitted light to make a "round trip" back to the camera after being reflected by the scene. As the speed of light is known, the round trip time to a particular feature in the scene may be used to determine a distance of the particular feature from the camera.

One type of TOF depth camera, known as a "gated" TOF depth camera, utilizes a series of light pulses in order to illuminate a scene imaged by the depth camera. For each light pulse, the depth camera is "gated" ON for a particular exposure period before being "gated" OFF again, thereby imaging the scene during the exposure period. A distance to a feature in the scene may be determined from an amount of light from the transmitted pulses that is reflected by the feature and registered by a pixel of the camera sensor during the exposure period.

SUMMARY

Embodiments related to accumulating charge during multiple exposure periods in an imaging system are disclosed. For example, one embodiment provides a method including accumulating a first charge on a photodetector during a first exposure period for a first light pulse, transferring the first charge to a charge storage mechanism, accumulating a second charge during a second exposure period for the first light pulse, and transferring the second charge to the charge storage mechanism. The method further includes accumulating an additional first charge during a first exposure period for a second light pulse, adding the additional first charge to the first charge to form an updated first charge, accumulating an additional second charge on the photodetector for a second exposure period for the second light pulse, and adding the additional second charge to the second charge to form an updated second charge.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As a field of view and/or a depth of field of view of a TOF depth camera increases, an accuracy and/or resolution of the camera may decrease. For example, a depth of field of view of a TOF depth camera may be increased by increasing a length of an exposure period during each light pulse. However, as reflections from a greater range of depths are incident upon the photodetector(s) during exposure period, increasing the length of the exposure period also may decrease depth accuracy.

Various factors may impact a resolution and accuracy of a TOF depth camera. Examples include, but are not limited to, light pulse width and shape, and exposure period width and shape. As such, techniques for seeking to improve the resolution and/or accuracy of a TOF depth camera may include adjusting light source intensity and/or light pulse shape (e.g., sharper ON/OFF transitions), matching light pulse shapes to exposure period shapes, and the like.

Accordingly, embodiments are disclosed that relate to the use of a plurality of short exposure periods for each light pulse in a pulsed light imaging process. Charge may be accumulated for each exposure period of a plurality of exposure periods across multiple light pulses by transferring accumulated charge back and forth between a photodetector and charge storage mechanism at appropriate times. The accumulated charges for each exposure period may then be converted to digital values after exposure for a desired number of pulses, as opposed to being converted after each exposure period. This may help to provide for faster operation and shorter exposure period during each pulse. While the disclosed embodiments are described in the context of a TOF depth imaging system, it will be understood that the disclosed concepts may be utilized in any other suitable photodetection system, including but not limited to those using other 3D and/or 2D imaging techniques.

Figure 1:
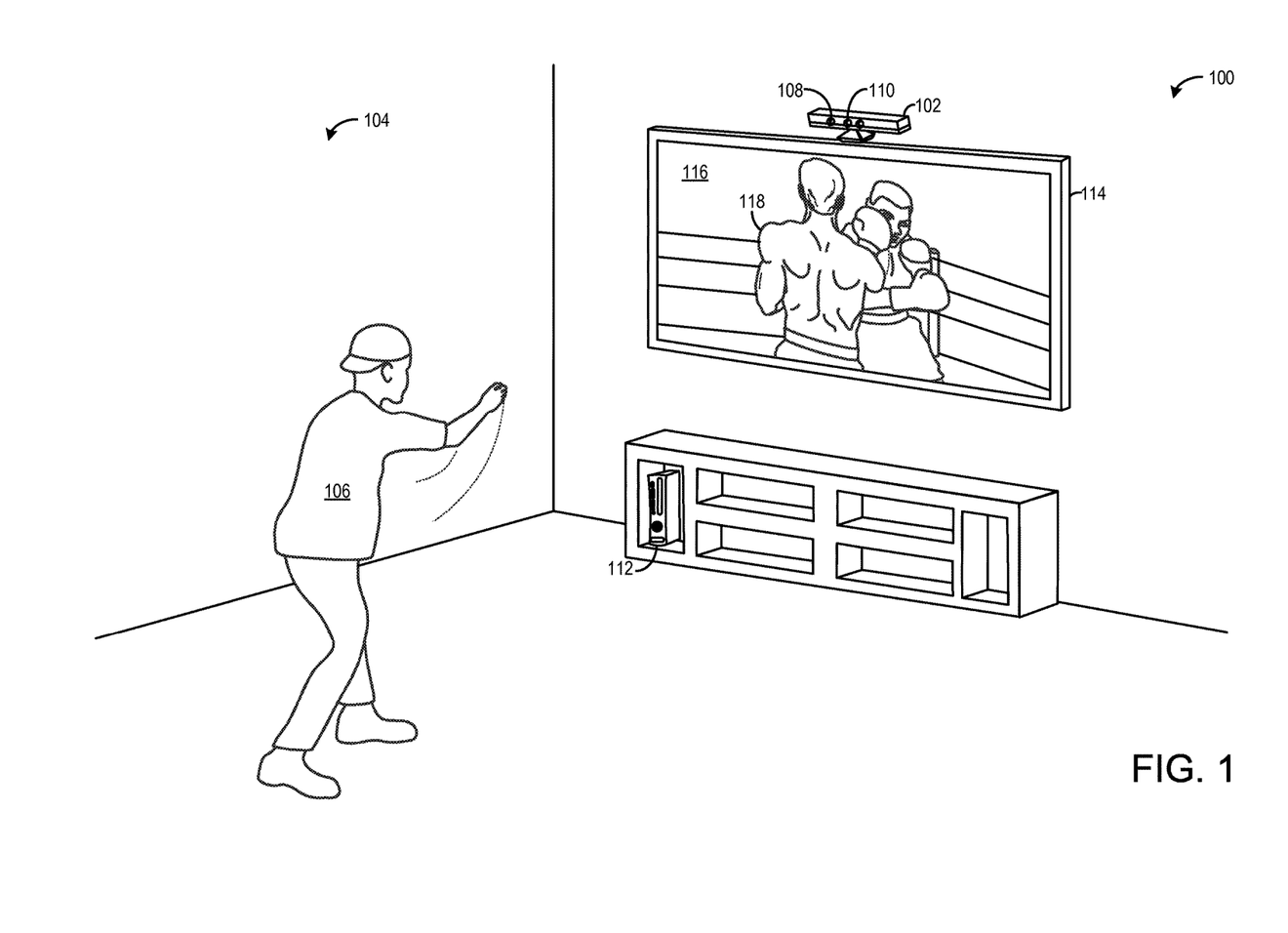
FIG. 1 shows an example use environment for a photodetection system in accordance with an embodiment of the present disclosure.

FIG. 1 shows an example use environment 100 a for photodetection system 102 according to the present disclosure. Photodetection system 102 takes the form of a TOF depth camera that may be used to recognize objects in the scene 104, monitor movement of one or more users 106, perform gesture recognition, etc. For example, a pose and/or position of user 106 may be determined via depth image data received from photodetection system 102.

Photodetection system 102 may include a light source 108 configured to provide a pulsed light output, and a photosensor 110 comprising an array of photodetectors configured to detect light from the light source that is reflected from the scene. In one non-limiting example, photodetection system 102 may include an infrared light to project infrared light onto the physical space. In other embodiments, photodetection system 102 may be configured to provide and recognize visible light instead of, or in addition to, infrared light. Light source 108 may provide coherent light (e.g., laser), incoherent light (e.g., one or more LEDs), and/or a combination thereof. It will be appreciated that such configurations are presented for the purpose of example, and are not intended to be limiting in any manner.

Based on the light received by photosensor 110, a depth map of scene 104 may be compiled. Photodetection system 102 may output the depth map derived from the light to entertainment system 112, where it may be used to create a representation of the scene. Photodetection system 102 may be operatively connected to the entertainment system 112 via one or more interfaces. As a non-limiting example, the entertainment system 112 may include a universal serial bus to which photodetection system 102 may be connected.

Entertainment system 112 may be used to play a variety of different games, play one or more different media types, and/or control or manipulate non-game applications and/or operating systems. As one example, display device 114 may be used to visually present video game 116 provided by entertainment system 112.

While the embodiment depicted in FIG. 1 shows entertainment system 112, display device 114, and photodetection system 102 as separate elements, in some embodiments one or more of the elements may be integrated into a common device. For example, entertainment system 112 and photodetection system 102 may be integrated in a common device.

Further, entertainment system 112 may be configured to communicate with one or more remote computing devices, not shown in FIG. 1. For example, entertainment system 112 may communicate with one or more remote services via the Internet or another network in order to analyze depth information received from photodetection system 102.

FIG. 1 also shows a scenario in which photodetection system 102 tracks user 106 so that the movements, positions, and/or poses of the user may be interpreted by entertainment system 112 to effect control over video game 116. In the illustrated boxing game scenario, photodetection system 102 may recognize the movement of user 106 and provide corresponding movement of player avatar 118 via display device 114. For example, upon detecting a punch thrown by user 106 via information received from photodetection system 102, entertainment system 112 may cause player avatar 118 to throw a corresponding punch.

Figure 2A:
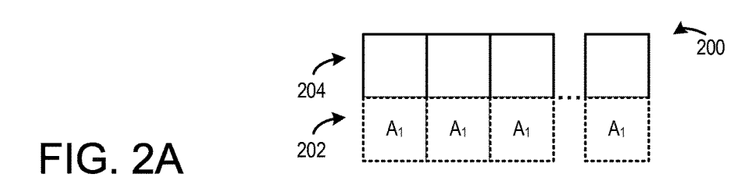
FIGS. 2A-2G schematically illustrate operation of an example embodiment of a photodetection system comprising an array of photodetectors.
Figure 2B:
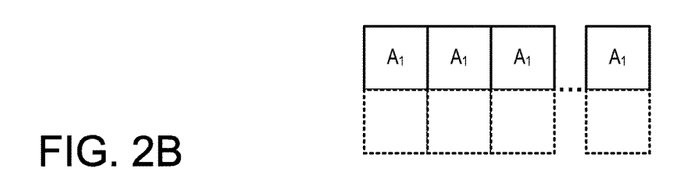
Figure 2C:
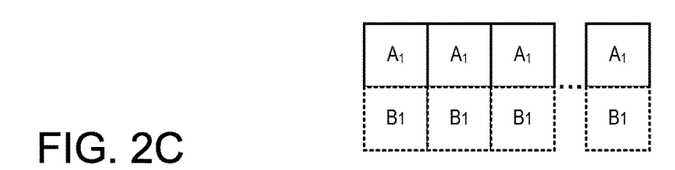
Figure 2D:
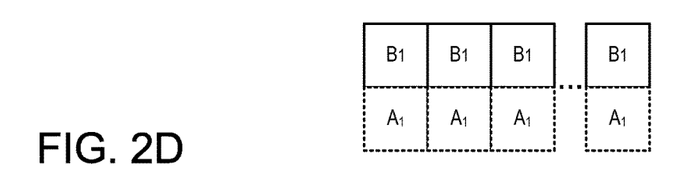
Figure 2E:
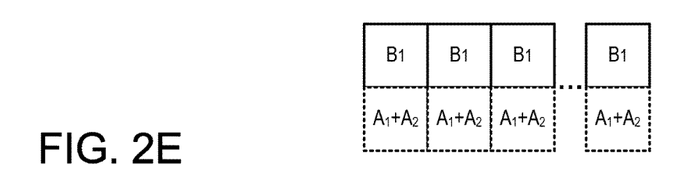
Figure 2F:
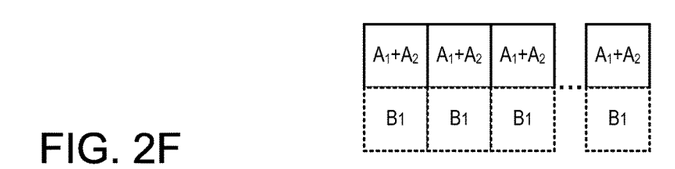
Figure 2G:
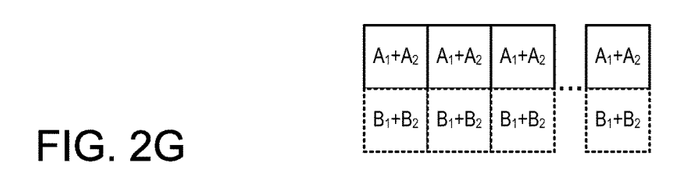
Figure 3:
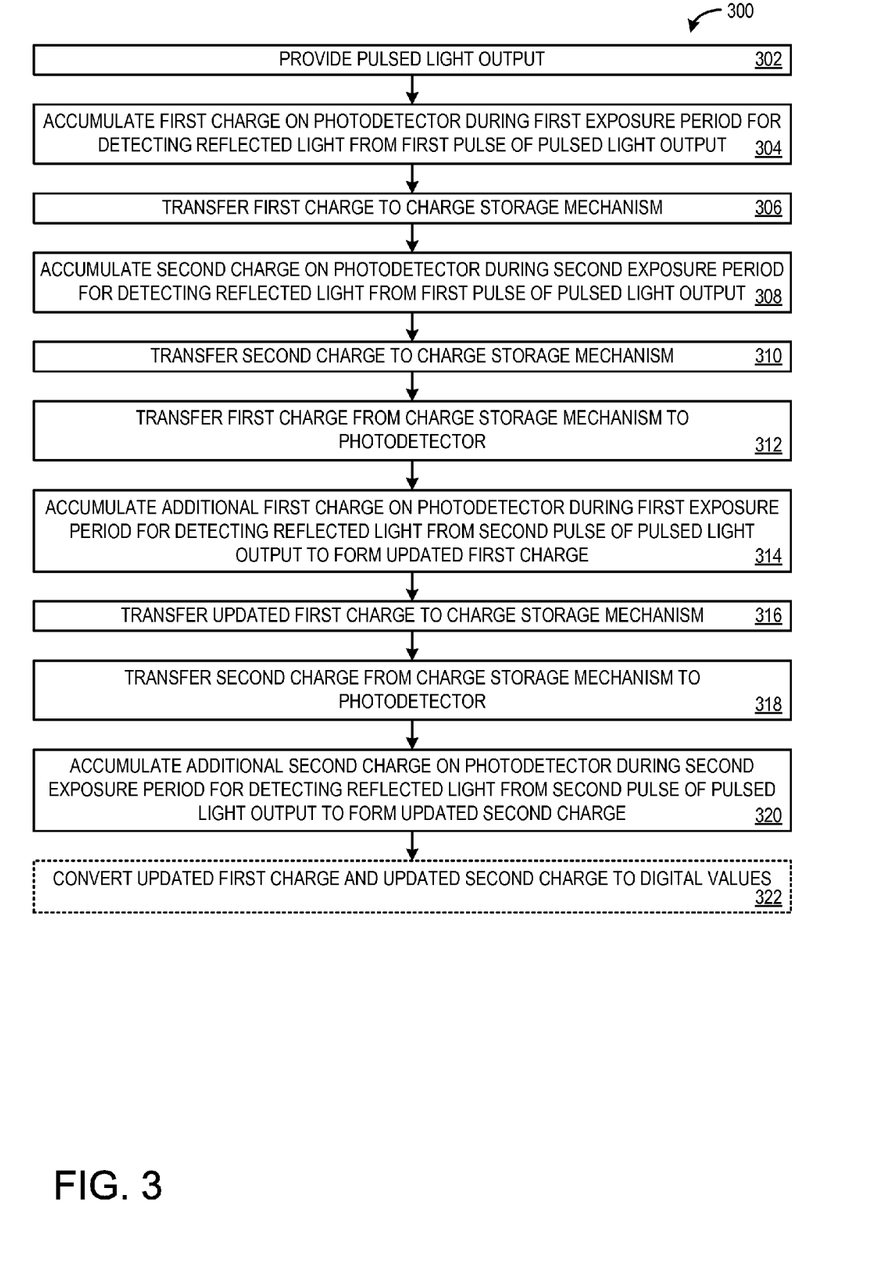
FIG. 3 schematically illustrates a method of operating a photodetection system in accordance with an embodiment of the present disclosure.

FIGS. 2A-2G schematically illustrate the operation of an example photosensor according to an embodiment of the present disclosure, and FIG. 3 shows a flowchart depicting an embodiment of a method 300 of operating a photosensor. In the discussion below, FIGS. 2A-2G will be referenced to illustrate the discussion of FIG. 3.

First referring to FIG. 2A, an example embodiment of a photosensor comprising an array 200 of photodetectors 202 (illustrated via a dashed outline) and charge storage mechanisms 204 is schematically shown. While FIG. 2A shows one row each of photodetectors 202 and charge storage mechanisms 204, it will be understood that a photosensor may comprise a two-dimensional array having a plurality of interleaved rows of charge storage mechanisms 204 and photodetectors 202.

The depicted array 200 of photodetectors 202 and charge storage mechanisms 204 may be a part of a charge-coupled device or other device in which electrical charge may be transferred between storage sites and photodetectors. Although the charge storage mechanisms 204 are depicted schematically as a single storage location, a charge storage mechanism for a photodetector may comprise multiple charge storage locations between which electrical charge may be moved, as explained below.

Likewise, while one charge storage mechanism 204 is shown for each photodetector 202, in some embodiments a photodetector may have more than one associated charge storage mechanism, and/or more than one photodetector may share a charge storage mechanism, where sufficient charge storage locations are available in a charge storage mechanism to store charge for multiple photodetectors without mixing the charges. It will be further appreciated that although array 200 comprises interleaved rows of photodetectors 202 and charge storage mechanisms 204, such a configuration is presented for the ease of understanding, and that other configurations are possible without departing from the scope of the disclosure. One such configuration will be discussed in greater detail with reference to FIGS. 4A and 4B.

Turning now to FIG. 3, method 300 comprises, at 302, providing a pulsed light output. As previously mentioned, the light output may be provided by a coherent light source, an incoherent light source, or a combination thereof. The light may be provided at any desired wavelength, including, but not limited to, infrared wavelengths.

At 304, method 300 comprises accumulating a first charge on the photodetector during a first exposure period for detecting reflected light from a first pulse of the pulsed light output. Referring again to FIG. 2A, array 200 is illustrated after accumulating a first charge on each photodetector 202 during a first exposure period $A_1$ corresponding to the first light pulse. The identifier A represents the exposure period, and the subscript 1 indicates that the exposure period was for the first light pulse. It will be understood that the accumulated charge on each photodetector after exposure period $A_1$ will correspond to the distance of any objects that reflect light from the light pulse to that photodetector.

At 306, method 300 comprises transferring the first charge to a charge storage mechanism. For example, FIG. 2B shows array 200 of FIG. 2A after the first charge from each photodetector 202 has been transferred to the corresponding charge storage mechanism 204. The charge transfer may be accomplished via any suitable process. For example, where the photodetector 202 and charge storage mechanism 204 are incorporated in a charge coupled device, charge may be transferred by changing relative polarities of electrodes associated with the photodetector 202 and charge storage mechanism 204.

After transferring charges accumulated during exposure period $A_1$, method 300 next comprises, at 308, accumulating a second charge on the photodetector during a second exposure period B for the first pulse of light of the pulsed light output. FIG. 2C shows array 200 after accumulating second charge on photodetectors 202 during second exposure period $B_1$ for the first light pulse. In some embodiments, the first exposure period and the second exposure period may have a substantially equivalent duration and/or shape, while in other embodiments each period may have a different duration and/or shape.

Accumulating charge for a single light pulse may result in a low signal-to-noise ratio, and/or may pose other issues. Thus, method 300 next comprises, at 310, transferring the second charge to the charge storage mechanism, and at 312, transferring the first charge from the charge storage mechanism to the photodetector. Thus, the first charge and the second charges for each photodetector are swapped between the photodetector and the charge storage mechanisms. FIG. 2D illustrates array 200 after such swapping.

Then, at 314, method 300 comprises accumulating an additional first charge on the photodetector during a first exposure period for detecting reflected light from a second pulse of the pulsed light output, thereby forming an updated first charge. This exposure period is shown in FIG. 2E as period $A_2$, which corresponds to an exposure period A for detecting reflected light from pulse 2. As the charge from period $A_1$ was transferred back to the photodetector prior to exposure during $A_2$, the updated first charge is shown as ("$A_1+A_2$"), and comprises charge produced by both of these exposure periods.

Method 300 further comprises, at 316, transferring the updated first charge to the charge storage mechanism at 316, and at 318, transferring the second charge from the charge storage mechanism. FIG. 2F illustrates array 200 after this transfer.

At 320, method 300 comprises accumulating an additional second charge on the photodetector during a second exposure period (i.e. exposure period B) for detecting reflected light from the second pulse of the pulsed light output (i.e. pulse 2), thereby forming an updated second charge. The charge arising from this exposure is represented by exposure period $B_2$ in FIG. 2G, and the updated second charge is shown as the sum of the charges from exposure periods B for the first and second light pulses (i.e. $B_1+B_2$).

After accumulating the charges, method 300 further comprises, at 322, converting the updated first charge and the updated second charge to digital values. The digital values may be usable, for example, to determine depth values that represent a depth of at least a portion of a scene imaged by the photodetector, wherein the depth values may be used to control a computing device (e.g., entertainment system 112) coupled to the photodetection system.

In the embodiment of FIGS. 2A-2G, two exposure periods for each of two light pulses are utilized. In other embodiments, additional exposure periods may be performed for each light pulse, and/or a greater number of pulses may be used. More generally, charge may be accumulated as described herein for any two or more exposure periods for any two or more light pulses of a pulsed light output. If a number of independent signals used to control photodetectors 202 and storage mechanisms 204 is "NV," then a maximum number of exposure periods "NEx" per transmitted light pulse may be represented by the expression: NEx=(NV−1)/2.

By providing a larger number of shorter exposure periods as opposed to a shorter number of longer exposure periods, depth determination inaccuracies occurring due to motion (e.g., user movement) during the exposure periods may be reduced. Further, as each exposure period is shortened, the range of possible depths represent by the light incident upon photodetectors during each exposure period is also reduced, which may help to increase depth resolution.

Accumulating charge across a relatively greater number of light pulses may help to increase a signal-to-noise ratio relative to the user of a lesser number of light pulses, as the shorter exposure periods may constrain an amount of charge that can be accumulated during any particular exposure period. Thus, the use of a relatively higher number of light pulses before converting the charges to digital values may help to reduce the effect of small variations in timing/ambient lighting intensity/etc. on the operation of a photodetection system.

It will be further appreciated that by converting the charges to digital values after accumulating charge during multiple exposure periods for multiple light pulses, as opposed to after a single pulse, the frequency of converting may be reduced. As the digital-to-analog conversion and storage process may be time-consuming in comparison to the length of the exposure periods, reducing the conversion frequency may help to enable the use of a greater number of shorter exposure periods during each light pulse.

It will be appreciated that each pulse of light may provide light centered at a particular wavelength, and this wavelength may vary between pulses. For example, in some embodiments, a first pulse may provide substantially red light, a second pulse may provide substantially green light, and a third pulse may provide substantially blue light. Other wavelengths are possible without departing from the scope of the present disclosure.

FIGS. 4A-4D show an embodiment of a photodetection system 400 comprising a charge storage mechanism that includes a set of first electrodes 402 and a set of second electrodes 403 configured to move charge storage locations 406 and buffer locations 408 around a photodetector 404. Buffer locations 408 operate to isolate charge stored in each charge storage location 406 from charge stored in nearby charge storage locations 406. As photodetection system 400 comprises six storage pixels 406, photodetection system 400 may support up to six exposure periods for each transmitted light pulse. However, it will be understood that any other suitable number of charge storage locations 406 and buffer locations 408 may be used. Photodetection system 400 further comprises a controller 410 configured to provide control signals 412, 414, and 416 via electrodes 402 in order to control operation of photodetection system 400.

Figure 4A:
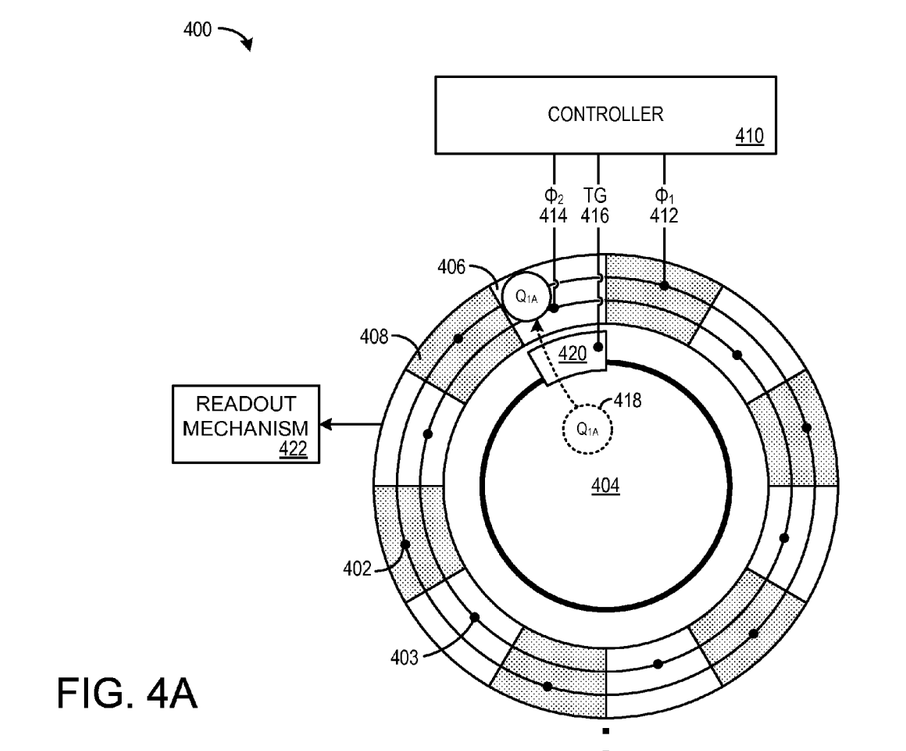
FIGS. 4A-4D schematically illustrate an example operation of a photodetection system in accordance with another embodiment of the present disclosure.

First referring to FIG. 4A, a charge $Q_{1A}$ is accumulated on photodetector 404 during a first exposure period (indicated by subscript "1") for a first light pulse (indicated by subscript "A"). Next, as illustrated by the dashed arrow, charge $Q_{1A}$ is transferred to a first charge storage location 406 by coupling the first charge storage location to photodetector 404 via transfer mechanism 420 (e.g., a transfer gate). For example, transfer mechanism 420 may be enabled while a positive charge is applied to the first charge storage location via electrodes 403, thereby resulting in charge $Q_{1A}$ being transferred to the first charge storage location.

Figure 4B:
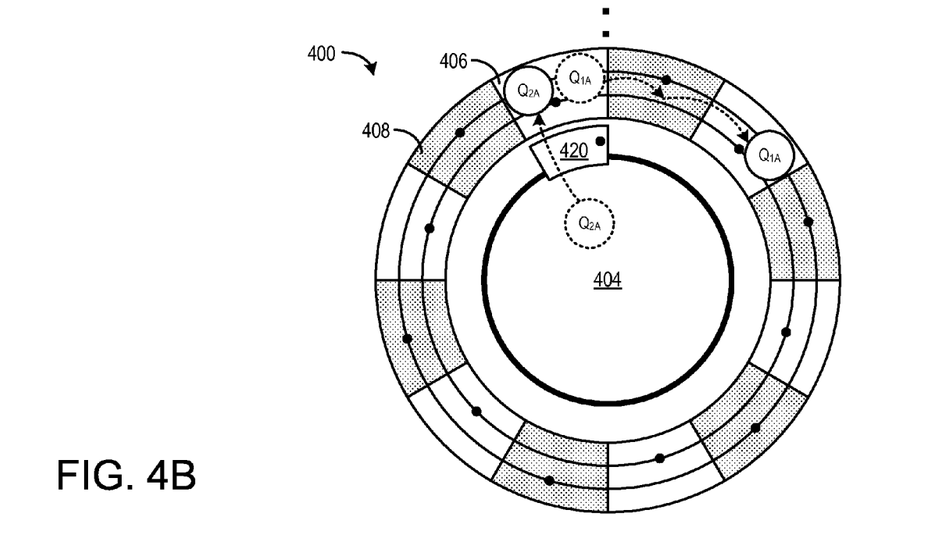

Next, as illustrated in FIG. 4B, charge $Q_{1A}$ may be transferred clockwise around the array by modulating voltages applied to electrodes 402 and electrodes 403. Although illustrated as being transferred clockwise, it will be appreciated that charge may be transferred in either direction depending upon device configuration and electrode operation.

Additionally, as illustrated by charge $Q_{2A}$, a charge may be accumulated on photodetector 404 for a second exposure period during light pulse A. Charge $Q_{2A}$ is then transferred to the first storage location via transfer mechanism 420, resulting in the first storage location and the second storage location storing charge $Q_{2A}$ and charge $Q_{1A}$, respectively.

Figure 4C:
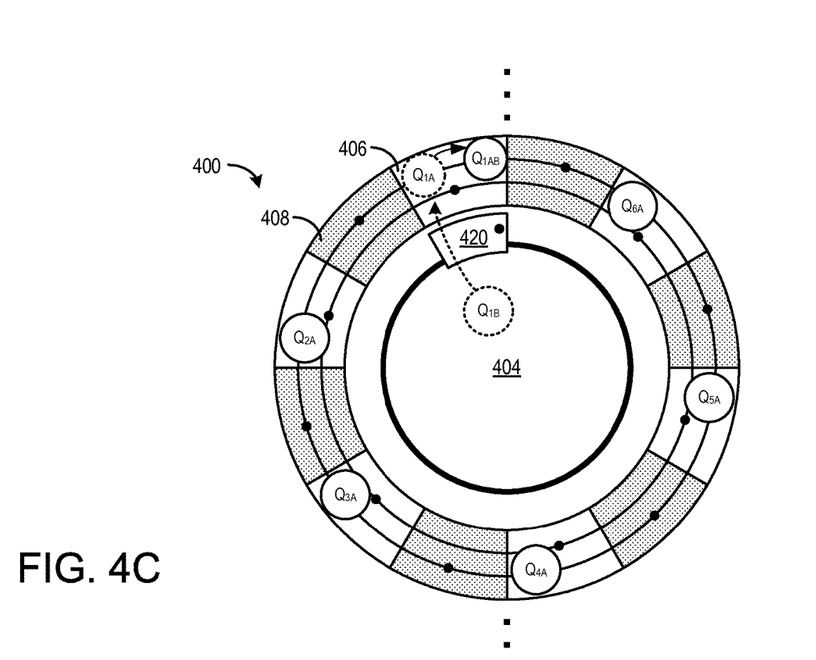

The charge accumulation and transfer processes may be performed for additional exposure periods during light pulse A. FIG. 4C, depicts the charge storage mechanism after exposing for six exposure periods during light pulse A, such that charge is stored at each storage location 406.

Figure 4D:
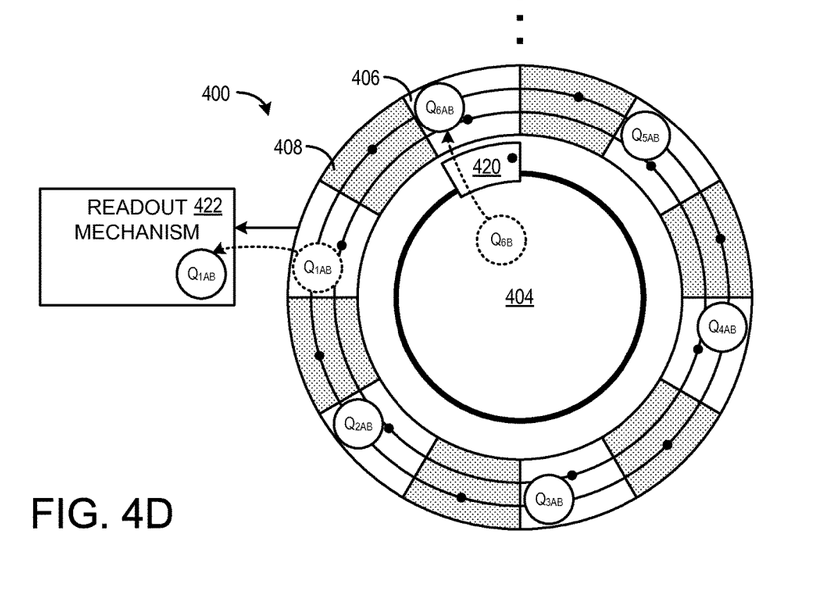

Next, additional charge may then be added to each stored charge for a second light pulse B. FIG. 4C shows an example of a charge accumulated during a first exposure period of light pulse B as charge $Q_{1B}$. After exposure, charge $Q_{1B}$ is added to charge $Q_{1A}$ by operation of transfer gate 420 when the previously accumulated charge from earlier light pulses (charge $Q_{1A}$) for that exposure period is located in the storage location adjacent to transfer gate 420, thereby producing summed charge $Q_{1AB}$. This process may then be repeated for additional exposure periods for light pulse B. FIG. 4D illustrates this as stored charges for each of the six exposure periods summed for the two light pulses A and B. In other embodiments, charge $Q_{1A}$ may be transferred to photodetector 404 prior to accumulating charge $Q_{1B}$, such that the charges are summed on the photodetector instead of in charge storage location 406.

In this manner, charges may be transferred around the charge storage mechanism of system 400 until a desired number of light pulses have been performed. While the process is depicted in FIGS. 4A-4D as being performed for two light pulses, it will be understood that any other suitable number of light pulses may be used. Then, as shown in FIG. 4D, the total accumulated charge for each exposure period (e.g., charge $Q_{1AB}$ for two light pulses) may be converted via one or more readout mechanisms 422 into a digital representation. As described above, such a digital representation may be usable to effect control over a computing device that receives input from the photodetection system 400, and/or for any other suitable purpose.

In some embodiments, the methods and processes described above may be tied to a computing system of one or more computing devices. In particular, such methods and processes may be implemented as a computer-application program or service, an application-programming interface (API), a library, and/or other computer program product.

Figure 5:
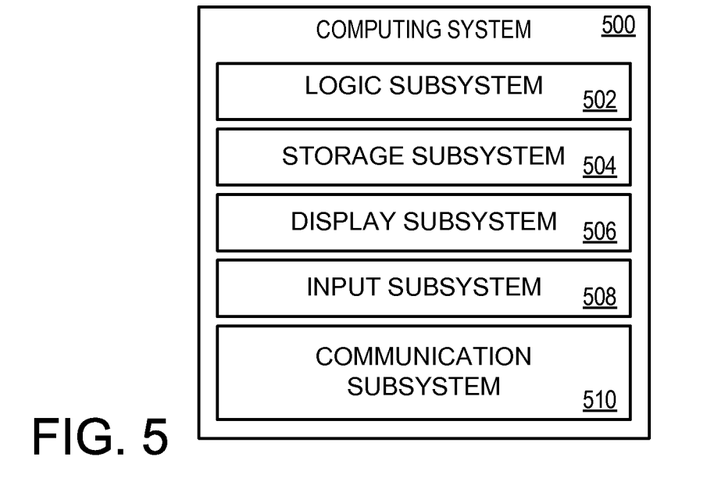
FIG. 5 illustrates an example embodiment of a computing system according to an embodiment of the present disclosure.

FIG. 5 schematically shows a non-limiting embodiment of a computing system 500 that can enact one or more of the methods and processes described above. Computing system 500 is shown in simplified form. Photodetection systems 102 and 400 and entertainment system 112 are non-limiting examples of computing system 500. It will be understood that any suitable computer architecture may be used without departing from the scope of this disclosure. In different embodiments, computing system 500 may take the form of a mainframe computer, server computer, desktop computer, laptop computer, tablet computer, home-entertainment computer, network computing device, gaming device, mobile computing device, mobile communication device (e.g., smart phone), wearable computer (e.g. head-mounted display), etc.

Computing system 500 includes a logic subsystem 502 and a storage subsystem 504. Computing system 500 may optionally include a display subsystem 506, input subsystem 508, communication subsystem 510, and/or other components not shown in FIG. 5.

Logic subsystem 502 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 504 includes one or more physical, non-transitory, devices configured to hold data and/or instructions executable by the logic subsystem to implement the methods and processes described herein. When such methods and processes are implemented, the state of storage subsystem 504 may be transformed—e.g., to hold different data.

Storage subsystem 504 may include removable media and/or built-in computer-readable storage devices. Storage subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 504 may include volatile, nonvolatile, dynamic, static, read/write, read-only, random-access, sequential-access, location-addressable, file-addressable, and/or content-addressable devices.

It will be appreciated that storage subsystem 504 includes one or more physical storage media. In some embodiments, aspects of the instructions described herein may be propagated via a transmission medium in the form of a signal (e.g., an electromagnetic signal, an optical signal, etc.), as opposed to being stored on a storage medium. Furthermore, data and/or other forms of information pertaining to the present disclosure may be propagated as a signal via a transmission medium.

In some embodiments, aspects of logic subsystem 502 and of storage subsystem 504 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

When included, display subsystem 506 may be used to present a visual representation of data held by storage subsystem 504. This visual representation may take the form of a graphical user interface (GUI). As the herein described methods and processes change the data held by the storage subsystem, and thus transform the state of the storage subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for operating a photosensor comprising an array of photodetectors, the method comprising:
providing a pulsed light output;
for each photodetector of a plurality of photodetectors of the photosensor,
accumulating a first charge for light received from a first pulse of the pulsed light output on the photodetector during a first exposure period for detecting reflected light from the first pulse of the pulsed light output;
transferring the first charge to a charge storage mechanism for the photodetector;
accumulating a second charge for light received from the first pulse of the pulsed light output on the photodetector during a second exposure period for detecting reflected light from the first pulse of the pulsed light output;
transferring the second charge to the charge storage mechanism;
then accumulating an additional first charge for light received from a second pulse of the pulsed light output on the photodetector during a first exposure period for detecting reflected light from the second pulse of the pulsed light output and adding the additional first charge to the first charge to form an updated first charge;
then transferring the updated first charge on the photodetector to the charge storage mechanism;
then accumulating an additional second charge for light received from the second pulse of the pulsed light output on the photodetector during a second exposure period for detecting reflected light from the second pulse of the pulsed light output and adding the additional second charge to the second charge to form an updated second charge; and
converting the updated first charge and the updated second charge to digital values.

2. The method of claim 1, wherein the pulsed light output is provided by a coherent light source.

3. The method of claim 1, wherein the first pulse of the pulsed light output provides light centered at first wavelength, wherein the second pulse of the pulsed light output provides light centered at a second wavelength, wherein the second wavelength is different from the first wavelength.

4. The method of claim 3, wherein the first pulse of the pulsed light output provides substantially red light, wherein the second pulse of the pulsed light output provides substantially blue light, and wherein a third pulse of the pulsed light output provides substantially green light.

5. The method of claim 1, wherein transferring charge to the charge storage mechanism comprises operating a transfer mechanism coupled between each photodetector and the charge storage mechanism.

6. The method of claim 1, wherein the photodetectors are interleaved with the charge storage mechanisms in the array.

7. The method of claim 1, wherein the charge storage mechanism comprises an array of electrodes arranged at least partially around each photodetector.

8. The method of claim 1, further comprising performing additional exposures during additional light pulses.

9. The method of claim 1, wherein the photosensor is a time-of-flight depth sensing system, and wherein the digital values represent a depth of a portion of a scene imaged by the photodetector.

10. A method for operating a photosensor comprising an array of photodetectors, the method comprising:
providing a plurality of pulses of a pulsed light output; and
for one or more pulses of the pulsed light output,
at each photodetector of a plurality of photodetectors of the array of photodetectors,
accumulating a first charge for light received from a current pulse of the pulsed light output based on an amount of light incident upon the photodetector during a first exposure period for the current pulse and adding the first charge to charge accumulated for light received at the photodetector from a pulse during each first exposure period of one or more previous pulses of the pulsed light output to form an updated first charge,
accumulating a second charge for light received from the current pulse of the pulsed light output based on an amount of light incident upon the photodetector during a second exposure period of the current pulse and adding the second charge to charge accumulated for light received at the photodetector from a pulse during each second exposure period of the one or more previous pulses of the pulsed light output to form an updated second charge, and
converting the updated first charge and the updated second charge to digital values.

11. The method of claim 10, wherein accumulating the first charge comprises transferring, from a charge storage mechanism to the photodetector, a sum of charges accumulated during the first exposure periods of all previous pulses of the pulsed light output.

12. The method of claim 11, wherein charge is transferred between the photodetector and the charge storage mechanism by operating a transfer electrode coupled between the photodetector and the charge storage mechanism.

13. The method of claim 10, wherein a first pulse of the plurality of pulses of the pulsed light output provides substantially red light, wherein a second pulse of the plurality of pulses of the pulsed light output provides substantially green light, and wherein a third pulse of the plurality of pulses of the pulsed light output provides substantially blue light.

14. The method of claim 10, further comprising converting the first charge and the second charge to digital values by providing the first charge and the second charge to a readout mechanism coupled to the charge storage mechanism.

15. A pulsed time-of-flight depth camera system, comprising:
- a light source;
- an image sensor comprising an array of photodetectors, and a charge storage mechanism associated with each photodetector, each of the charge storage mechanism and associated photodetector being configured to allow charge to be transferred between the charge storage mechanism and the associated photodetector;
- a logic device; and
- a storage device comprising instructions stored thereon that are executable by the logic device to, for each photodetector of the array of photodetectors:
    - provide a pulsed light output via the light source;
    - accumulate a first charge for light received from a first pulse of the pulsed light output on the photodetector during a first exposure period for detecting reflected light from the first pulse of the pulsed light output;
    - transfer the first charge to a charge storage mechanism;
    - accumulate a second charge for light received from the first pulse of the pulsed light output on the photodetector element during a second exposure period for detecting reflected light from the first pulse of the pulsed light output;
    - transfer the second charge accumulated on the photodetector to the charge storage mechanism;
    - transfer the first charge back to the photodetector to receive an additional first charge at the photodetector;
    - accumulate the additional first charge for light received from a second pulse of the pulsed light output on the photodetector during a first exposure period for detecting reflected light from the second pulse of the pulsed light output to form an updated first charge;
    - transfer the updated first charge on the photodetector to the charge storage mechanism;
    - transfer the second charge back to the photodetector to receive an additional second charge at the photodetector;
    - accumulate the additional second charge for light received from the second pulse of the pulsed light output on the photodetector during a second exposure period for detecting reflected light from the second pulse of the pulsed light output to form an updated second charge, and
    - convert the updated first charge and the updated second charge to digital values.

16. The pulsed time-of-flight depth camera system of claim 15, wherein each charge storage element comprises a plurality of charge storage locations.

17. The pulsed time-of-flight depth camera system of claim 16, wherein the plurality of charge storage locations are arranged at least partially around the photodetector.

18. The pulsed time-of-flight depth camera system of claim 15, wherein the instructions are further executable to accumulate additional first charge and additional second charge during a third pulse of the pulsed light output.

* * * * *